US007728700B2

(12) United States Patent
Sieber et al.

(10) Patent No.: US 7,728,700 B2

(45) Date of Patent: Jun. 1, 2010

(54) HIGH FREQUENCY FILTER IN A COAXIAL CONSTRUCTION, IN PARTICULAR IN THE MANNER OF A HIGH FREQUENCY SEPARATING FILTER (FOR EXAMPLE A DUPLEX SEPARATING FILTER) OR A BANDPASS FILTER OR BAND-STOP FILTER

(75) Inventors: Wolfgang Sieber, Kolbermoor (DE); Franz Rottmoser, Schechen (DE)

(73) Assignee: Kathrein-Werke KG, Rosenheim (DE)

( * ) Notice: Subject to any disclaimer, the term of this patent is extended or adjusted under 35 U.S.C. 154(b) by 100 days.

(21) Appl. No.: 11/826,898

(22) Filed: Jul. 19, 2007

(65) Prior Publication Data

US 2008/0024248 A1 Jan. 31, 2008

(30) Foreign Application Priority Data

Jul. 20, 2006 (DE) ....................... 10 2006 033 704

(51) Int. Cl.
*H01P 3/06* (2006.01)
*F16B 39/30* (2006.01)

(52) U.S. Cl. ....................... 333/206; 333/207; 411/307; 411/393

(58) Field of Classification Search ................. 411/307, 411/393; 333/206, 207
See application file for complete search history.

(56) References Cited

U.S. PATENT DOCUMENTS 3,227,199 A 1/1966 Wadsworth
3,454,070 A * 7/1969 Phipard, Jr. ................. 411/168
3,876,153 A 4/1975 Roosa
3,929,023 A * 12/1975 Ambruoso, Sr. ........... 74/10.85
4,364,136 A * 12/1982 Hattan ......................... 470/21
4,846,614 A * 7/1989 Steinbock ................... 411/307
4,854,794 A * 8/1989 Oertel ........................ 411/307
5,882,160 A * 3/1999 Iwata ......................... 411/307
6,337,611 B1 * 1/2002 Hult ........................... 333/202

(Continued)

FOREIGN PATENT DOCUMENTS

DE 38 79 265 6/1993

(Continued)

OTHER PUBLICATIONS

International Preliminary Examination Report issued in corresponding PCT application PCT/EP2007/004645 (Aug. 18, 2008).

(Continued)

*Primary Examiner*—Robert Pascal
*Assistant Examiner*—Kimberly E Glenn
(74) *Attorney, Agent, or Firm*—Nixon & Vanderhye PC

(57) ABSTRACT

An improved high frequency filter in a coaxial construction with one or a plurality of resonators has a thread pitch or thread pitch angle of an external thread of a thread-like tuning element which differs from the thread pitch or the thread pitch angle of the internal thread of the thread receiver at least in a partial portion of the length of the internal thread and/or of the external thread. The difference between the thread pitches or the thread pitch angles between the external thread of the thread-like tuning element and the internal thread of the thread receiver is more than 0.5%, and preferably 1% to 5%.

23 Claims, 4 Drawing Sheets

U.S. PATENT DOCUMENTS

| | | | | |
|---|---|---|---|---|
| 6,384,699 | B1 * | 5/2002 | Henningsson et al. | 333/224 |
| 6,734,766 | B2 | 5/2004 | Lye et al. | |
| 7,227,434 | B2 * | 6/2007 | Haraldsson et al. | 333/232 |
| 2003/0103832 | A1 | 6/2003 | Cords et al. | |
| 2004/0246071 | A1 | 12/2004 | Rottmoser et al. | |

FOREIGN PATENT DOCUMENTS

| | | | |
|---|---|---|---|
| DE | 10 2004 010 683 | | 9/2005 |
| DE | 10 2004 055707 | | 4/2006 |
| EP | 0460264 | A1 | 12/1991 |
| EP | 1 169 747 | | 6/2002 |
| FR | 2495511 | | 12/1980 |
| GB | 569581 | | 11/1944 |
| GB | 2163829 | A | 3/1986 |

OTHER PUBLICATIONS

Macchiarella et al, "Experimental Study of Passive Intermodulation in Coaxial Cavities for Cellular Base Stations Duplexers," 34th European Microwave Conference, Amsterdam, pp. 981-984 (2004).

* cited by examiner

FIG. 4
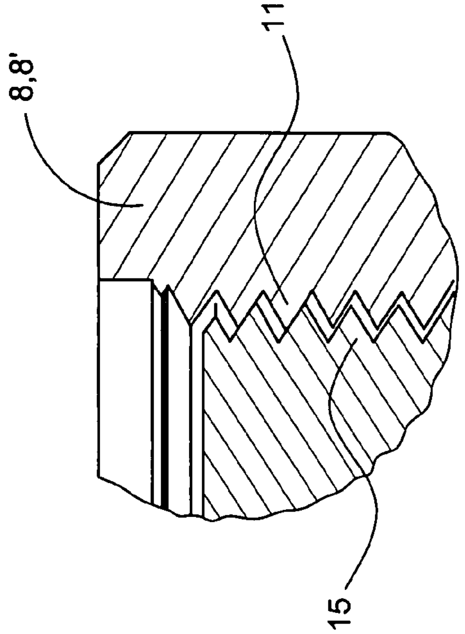
FIG. 5
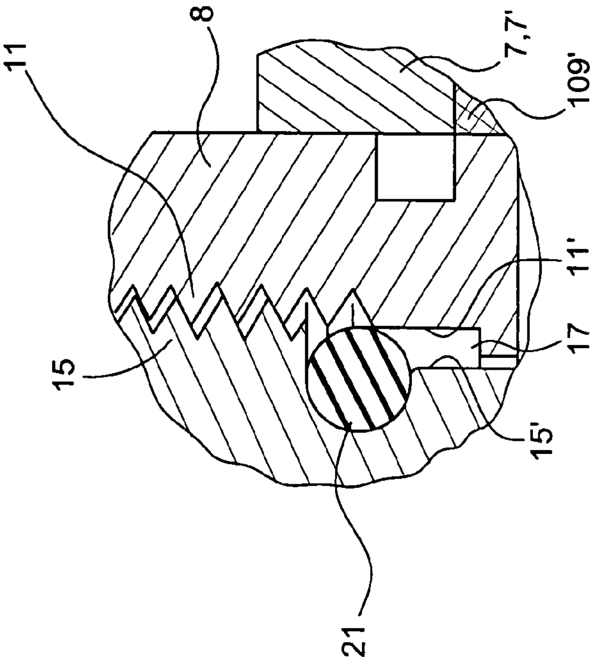
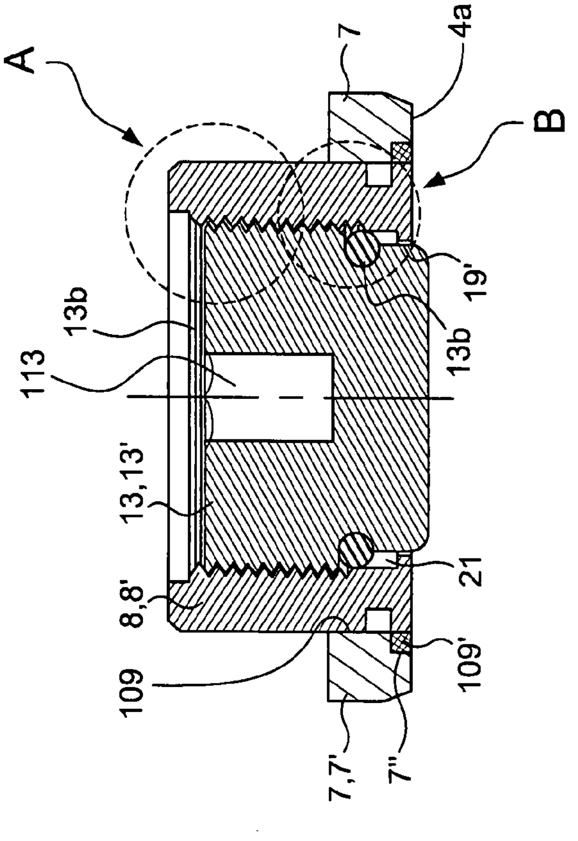
FIG. 3

D-D

HIGH FREQUENCY FILTER IN A COAXIAL CONSTRUCTION, IN PARTICULAR IN THE MANNER OF A HIGH FREQUENCY SEPARATING FILTER (FOR EXAMPLE A DUPLEX SEPARATING FILTER) OR A BANDPASS FILTER OR BAND-STOP FILTER

This application claims priority to DE 10 2006 033 704.2 filed 20 Jul. 2006, the entire contents of which are hereby incorporated by reference.

The technology herein relates to a high frequency filter in a coaxial construction, in particular in the manner of a high frequency separating filter (such as, for example, a duplex separating filter) or a bandpass filter or band-stop filter.

PRIOR ART

In radio systems, in particular in the mobile radio sector, a common antenna is frequently used for transmitting and receiving signals. In this case, the transmitting and receiving signals in each case use different frequency ranges, and the antenna must be suitable for transmitting and receiving in the two frequency ranges. Therefore, to separate the transmitting and receiving signals, a suitable frequency filtering is required, with which, on the one hand, the transmitting signals are passed from the transmitter to the antenna and, on the other hand, the receiving signals are passed from the antenna to the receiver. To separate the transmitting and receiving signals, nowadays, inter alia, high frequency filters in a coaxial construction are used.

For example, a pair of high frequency filters can be used, which both allow a certain frequency band to pass (bandpass filters). As an alternative, a pair of high frequency filters can be used, which both block a certain frequency band (band-stop filters). Furthermore, a pair of high frequency filters can be used, of which one filter allows frequencies below a frequency between the transmitting and receiving band to pass and blocks frequencies above this frequency (low-pass filters), and the other filter blocks frequencies below a frequency between the transmitting and receiving band and allows frequencies above this to pass (high-pass filters). Further combinations of the filter types just mentioned are also conceivable.

High frequency filters are frequently constructed from coaxial resonators, as they consist of milled parts or cast parts, so they are simple to produce. Moreover, these resonators ensure a high electrical quality and relatively good temperature stability.

An example of a coaxial high frequency filter is described in the document EP 1 169 747 B1. This filter comprises a resonator with a cylindrical internal conductor and a cylindrical external conductor, wherein between one free end of the internal conductor and a cover fastened on the external conductor, a capacitance is formed, which influences the resonance frequency. Furthermore, the resonator comprises a tuning element of dielectric material, with which the resonance frequency of the filter can be adjusted. The tuning element is movable in the internal conductor of the resonator, so the capacitance between the free end of the internal conductor and the cover of the resonator is changed and thus varies the resonance frequency.

Coaxial resonator filters with a plurality of individual resonators coupled to one another are known from the document "Theory and Design of Microwave Filters", Ian Hunter, IEE Electromagnetic Waves Series 48, Section 5.8.

A generic high frequency filter has become known, for example, from U.S. Pat. No. 6,734,766 B2. A screw or thread element is provided in this coaxial resonator as a tuning element, which penetrates a threaded bore in the cover of the resonator housing and protrudes with its end projecting into the inner space of the resonator into an axial recess in the internal conductor. A tuning of the resonator can thus be carried out by rotating the stop screw. Air is generally used as the dielectric between the internal and external conductor. If the one end of the resonator is shorted at the base in this case, and air is used as the dielectric, for example, the mechanical length of the resonator corresponds to about ¼ of the electric wavelength. The resonance of the high frequency filter thus formed is, in this case, determined in a known manner by the length of the internal conductor, by the size of the cavity of the resonator, by the size of the spacing between the internal conductor and the opposing cover and, above all, by the length of the stop screw protruding into the inner space of the cavity of the resonator. Thus, the longer the internal conductor, the greater is the wavelength and therefore the lower the resonance frequency. The coupling of the resonators is all the weaker, the further the internal conductors of two resonators are distanced from one another and the smaller the opening of the screen between the internal conductors.

In particular when constructing high frequency separating filters (for example duplex separating filters) or bandpass filters or band-stop filters using a plurality of coaxial high frequency filters, it is necessary, because of the manufacturing tolerances both with regard to the production of the casting tool and also in the actual casting or milling process, to balance the corresponding high frequency filters. This balancing generally takes place by rotating balancing elements, for example the aforementioned threaded members protruding into the resonator cavity. Furthermore, in particular in the case of increased requirements, it is often necessary to carry out a fine adjustment at the balancing element during the filter balancing.

In order to be able to permanently ensure this fine adjustment and to keep a passive intermodulation caused by poor electrical contacts as low as possible, it is also provided in the generic U.S. Pat. No. 6,734,766 B2 that the threaded member penetrating the cover outwardly is secured using a counter nut screwed on there and braced with the outside of the cover.

Resonators of this type are produced, for example, by means of milling or casting technology. Corresponding filters may be constructed from a plurality of coaxial TEM resonators. TEM is an abbreviation, in this case, for transversal-electromagnetic. The bandpass filters mentioned, in this case, also consist of resonators electrically connected to one another via coupling screens, which may also be constructed in turn by milling or casting technology, which are thus distinguished by comparatively simple production with simultaneously high achievable electrical quality and relatively high temperature stability.

In the solutions which have previously become known, the necessary fine balancing to tune the resonators is very intensive with respect to time and cost. The respective releasing and fixing of the counter nuts also increases the balancing time owing to the additional working step of securing the thread.

Tuning members of this type could basically just as well be provided at the free end of the internal conductor, where they can be screwed into the internal conductor to a different extent by means of a thread engagement whereby the spacing between the upper side of the thread-like tuning element and the lower side of the adjacent cover or base is changed. The tuning can also be implemented similarly by this. In order to be able to carry out this tuning without the cover having to be opened, the internal conductor is preferably provided with a continuous bore, so a corresponding tool (for example a screwdriver) can be introduced into this bore penetrating the internal conductor from the outside from the lower side of the housing and the thread-like stop element can be rotated by means of a slot engagement in order to change its axial position relative to the internal conductor.

Basically, there is also the possibility of using a so-called slotted, resilient thread for the threaded member. The production and use of a slotted threaded member of this type can, however, only be mechanically implemented at great expense.

Finally, a hyperfrequency oscillator with a dielectric resonator has become known from DE 38 79 265 T2. The cover opposing the resonator has a shaft with an internal thread, in which a hollow double screw is seated. A self-locking adjustable screw is located in the inner space of this double screw. The double screw and the self-locking screw are used to adjust the oscillation frequency of the oscillator.

It is an object of the present invention therefore, proceeding from the generic prior art, to provide an improved possibility for tuning resonators, i.e. individual resonators, high frequency filters, frequency separating filters, bandpass filters, band-stop filters and the like.

According to the invention, a threaded member is thus used, the external thread of which has a thread turn, which differs from the thread turn of the internal thread and the thread bore, which is penetrated by the threaded member. The difference in the thread turn should preferably be at least 0.5% or 1%, above all at least 1.5%. A maximum value of 5% is generally sufficient. Preferably, the thread turns should thus differ at least in a partial portion of the internal thread of the thread bore and/or of the external thread of the threaded member by, for example, 2 to 4%, preferably by 2.5 to 3.5%, in particular by 3%.

In other words, the pitch or the pitch angle of the external and therefore cooperating internal thread should thus differ by, for example, 0.5 to 5%, preferably by 1.5% to 5%, in particular 2 to 4%, in particular 2.5 to 3.5% or, as mentioned, by about 3%. This may be a single-turn or multi-turn thread. The thread depth or the flank angle of the thread may also be selected so as to differ within broad ranges.

An automatic self-locking of the screw is implemented due to this construction; i.e., the thread-like tuning element is to be rotated with increased exertion of force until it has reached the desired tuning position. Because of the thread defects provided according to the invention, a pressing takes place such that the use of a counter nut is no longer necessary.

However, it is even more important that, because of the thread defects mentioned, a maximum bracing is established between the external thread of the threaded member and the internal thread of the thread bore in the resonance filter housing (in particular the resonance filter cover) at the axially remote threaded portions, above all at the thread portions located furthest in or furthest out, as the thread defect has the greatest effect here because of its axial extent. This results in clearly reproducible electrical conditions being produced precisely at these positions because of the high contact forces, so undesired intermodulation effects can be avoided.

The same principle according to the invention also applies when the thread-like tuning element at the free end of the internal conductor can be screwed therein to a different extent, as clearly reproducible electrical conditions can also be implemented here owing to the design of the thread turns according to the invention and in addition a firm fit of the thread-like tuning element is ensured.

Since in the scope of the invention counter nuts can also be dispensed with, the balancing time is clearly reduced. Significantly fewer working steps are required in order to correspondingly adjust and balance a single resonator or a plurality of resonators of a filter assembly. The balancing elements according to the invention are also economical to produce and use. The waste is also reduced because of the simple construction of the tuning elements.

The invention will be described in more detail below with the aid of drawings. In the drawings, in detail:

FIG. 3 shows an enlarged detailed view to make clear a tuning element according to the invention;

FIG. 4 shows an enlarged detailed view A in FIG. 3;

FIG. 5 shows an enlarged detailed view B from FIG. 3;

Figure 1:
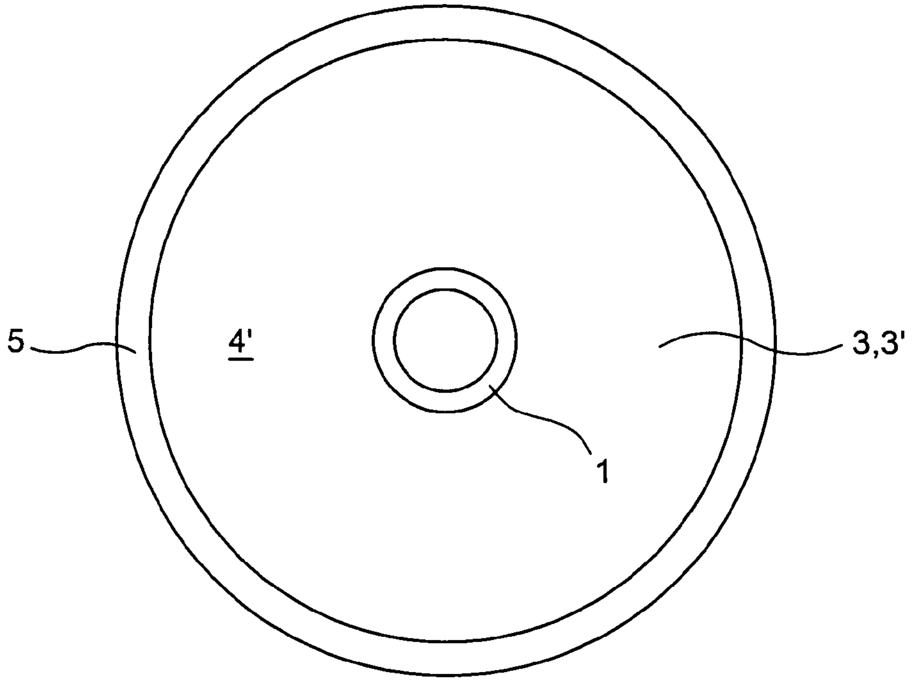
FIG. 1 shows a schematic cross-sectional view running transversely to the axial extension, of a coaxial TEM resonator according to the invention.
Figure 2:
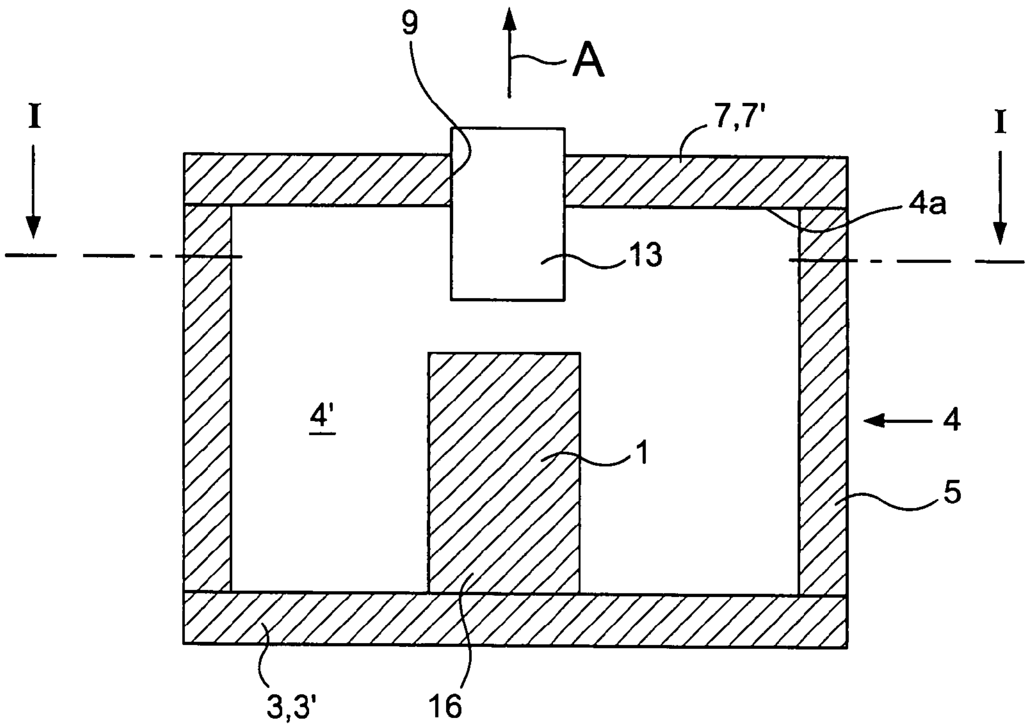
FIG. 2 shows an axial sectional view with respect to the embodiment of FIG. 1.

An individual high frequency filter is shown in schematic cross-section in FIG. 1 and in axial longitudinal section in FIG. 2 and in cross-section along the line II-II in FIG. 2. It can be seen from this that the resonator according to the invention or the high frequency filter according to the invention is constructed in a coaxial construction and extends along an axis A. The resonator comprises an electrically conductive internal conductor 1 which is generally constructed in a cylindrical or tubular manner, the lower end 1*b* of which is seated on a lower end wall 3, which forms a base 3' of the resonator. The internal conductor 1 is accommodated in a housing 4, which comprises an external conductor 5, which is connected to the lower end wall 3, i.e. the base 3'.

A further end wall 7 is provided on the upper side thus formed, which according to the embodiment shown, forms the cover 7' opposing the base 3'. All the parts mentioned above, i.e. the internal conductor 1, the base 3', the external conductor 5 and the cover 7, 7' are electrically conductive or covered with an electrically conductive layer, the upper end 1*a* of the internal conductor 1 opposing the lower end 1*b* ending at a spacing below the upper end wall 7 forming the cover 7'.

It is basically noted that the internal conductor is generally mechanically fastened on the end wall forming the base 3' or formed thereon and electrically-galvanically connected to this end wall 3. However it would basically also be possible for the internal conductor 1 to be connected to the opposing end wall 7. i.e., to the end wall 7 forming the cover 7' in the embodiment shown, or formed thereon or fastened thereto and electrically-galvanically connected thereto so the free end 1*a* of the internal conductor 1 would then end at the spacing from the end wall 3 forming the base 3'.

The diameter of the internal conductor 1, in the embodiment shown, is cylindrical or tubular, but may deviate from this form. The tubular external conductor 5, i.e. the outer wall of the housing 4 thus formed may have a different cross-section, for example be annular, more rectangular or square, in general n-polygonal in design. Individual outer wall portions may have curved cross-sectional shapes.

Moreover, the diameter may also vary over its axial length of the internal conductor 1, for example have portions where a larger or a smaller diameter is provided. The diameter may change continuously in the axial direction or continuously in a partial length or form steps there, for example, in that the internal conductor passes from a larger diameter portion into a comparatively small diameter portion and vice versa. In the same way rotationally symmetrical portions may preferably also be provided at the upper free end of the internal conductor, for example plate-shaped ones, which have a larger external diameter than the external diameter of the internal conductor seated therebelow. In the same way, however, a portion with a tapering external diameter may also be provided here for the internal conductor. Substantially any changes are possible here.

The resonance of the HF filter is preferably in the range of ¼ of the electrical length of the internal conductor 1.

As can be seen from FIG. 1, a bore 9 is configured in the end wall 7 seated at a spacing over the free end 1*a* of the internal conductor 1 (in the embodiment shown, in other words, in the cover 7') and is provided at least in an axial partial length with an internal thread 11, as can be seen in the detailed view according to FIG. 3 and in the enlarged sectional view according to FIGS. 4 and 5.

A tuning element 13, which consists of a threaded member 13' and therefore is provided with an external thread 15 at least in an axial partial length, can be screwed into this internal thread 11.

As the thickness of the end wall 7, i.e. the cover 7' is or may be comparatively thin and a cooperation of the internal thread 11 with the external thread 15 of the spacer element 13 should take place over a relatively large axial distance, a threaded bush 8 is provided in the embodiment shown, which is inserted and anchored in a corresponding recess 109 in the end wall 7, i.e. in the cover 7'. This threaded bush 8 has, for this purpose, a flange 109' located on the inside in the resonator housing, which flange engages in a corresponding annular recess 7" in an end wall 7 or in the cover 7', so the threaded bush with its inwardly pointing surface is flush with the inner surface of the end wall 7, 7'. The internal thread 11 mentioned is then configured on the inside in this threaded sleeve, into which internal thread the stop element 13 in the form of the threaded member 13' with its external thread 15 can be screwed.

It can be seen in particular from the enlarged detailed view according to FIGS. 3 to 5, that the external thread 15 on the tuning element 13 only extends over a partial length and a thread-free portion 15' is provided. This thread-free portion 15' is closer to the end side 13*a* of the tuning element 13 (which faces the inner space 4' of the resonator housing 4) than the outer end face 13*b* of the tuning element 13.

The bore 9 (which can basically be introduced in the end wall or the cover 7, 7', but in the embodiment shown is preferably introduced in the threaded bush 8, which is incorporated in the cover 7') is likewise designed such that the internal thread 11 extending in the bore 9 from the outside in does not reach to the inside 4*a* of the inner space 4' of the resonator, but a thread-free portion 11' is also left there, so in the corresponding view according to FIGS. 3 and 5, depending on the screwing depth of the tuning element 13, a distancing annular space 17 is formed between the two thread-free portions 11' and 15'. Only very low field intensities are provided in this distancing annular space 17. The axial height of this distancing space may, for example, be 0.5 mm to a plurality of millimeters, for example 0.5 mm to 3 mm preferably about 1 mm.

The distancing annular space 17 mentioned is delimited with respect to the inside 4*a* of the housing with a peripheral annular shoulder 19, which rests with its inner delimiting face 19' in a region of the thread-free portion 15' of the tuning element 13, in other words of the threaded member 13' or ends directly adjacent thereto.

Finally, an annular seal 21 is also provided, for which purpose an annular recess 13*b* is provided in the tuning element 13 in the embodiment shown, in the embodiment shown directly adjacent to the transition region from the thread-free portion 15' to the external thread 15 provided. In the embodiment shown, the annular seal 21 inserted therein is supported in the annular recess 23*b* and rests with its opposing external periphery on the threaded bush 8 (basically, the annular seal could also be incorporated in a corresponding annular recess in the threaded bush, so the annular seal then rests with its inwardly pointing external portion on the tuning element 13).

In order to provide an adequate axial height for the tuning element 13, interactively with the internal thread 11, the internal thread 11 is not incorporated in the end wall 7 in the form of the cover 7' but in a threaded bush 8 incorporated in the end wall 7, which threaded bush has a greater axial height than the thickness of the end wall 7, i.e. of the cover 7'.

In order, on the one hand, to reduce undesired passive intermodulations (in other words undesired "PIM") and, on the other hand, to improve the electric contact effect, and finally moreover to ensure a self-locking (so a counter nut can be dispensed with), the thread turn of the tuning element 13 (in other words of the threaded member 13') and the thread turn of the thread bush 8 (in other words the receiver 8') are provided with a "thread defect". This "thread defect" is produced in that the thread pitch, in other words the pitch angle of the external thread 15 differs from the thread pitch or the pitch angle of the internal thread 11 preferably by at least 0.5% or at least 1%, in particular by more than 1.5%. On the other hand, this difference in the thread turn, i.e. this difference in the thread pitch or the pitch angle should not generally be more than 5%, so a preferred region is between 2% and 4%, in particular between 2.5% and 3.5%, above all about 3%.

Because of this thread defect introduced in a deliberate manner no additional working step is necessary any longer for fixing a final tuning, as the thread member thus formed is self-locking. No additional costs are incurred either as a tuning element of this type is produced like a conventional screw. As in addition no counter nut is necessary any longer, the space requirement is also reduced. Finally, the tuning element thus formed produces permanently disregardably small passive intermodulation products as a defined and constant electrical contact is produced.

Deviating from the embodiment shown, the threaded sleeve 8 could also be part of the housing, i.e. in particular the end wall 7 or in particular the cover 7'. To this extent, a threaded receiver 8' can be referred to in general, which is part of the housing and/or may also be in the form of a separate threaded sleeve 8, which is mechanically rigidly and electrically conductively connected at the corresponding point to the housing (in the embodiment shown to the end wall 7 or the cover 7').

As can be seen, in particular, from FIG. 3, the tuning element, on the outwardly pointing side, also has an engagement portion 113, which may, for example, be formed into the shape of a slot. An intervention can be made here with a tool, for example in the form of a screwdriver, to rotate the thread-like tuning element. This engagement portion 113 thus points outwardly, in other words is accessible from outside.

Deviating from the embodiment shown, the internal thread in the receiver 8', in other words in the threaded sleeve 8, for example in the middle area, could also be thread-free in design, so internal thread portions 11 facing the two end regions of the threaded sleeve 8 and therefore located axially offset with respect to one another are formed. Likewise, the threaded member 13' could also be thread-free in design in the middle region, for example, as the desired self-locking pre-stressing forces do not act in the middle region, but above all between the axially most remote thread turns of the tuning element and of the inner thread 11 of the threaded receiver 8'.

Figure 6:
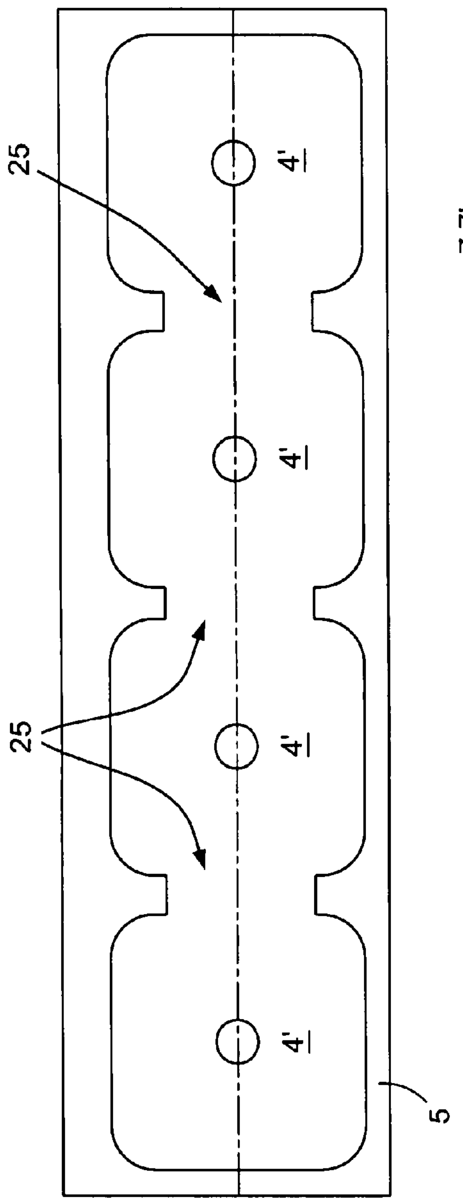
FIG. 6 shows a schematic cross-sectional view through a four-circle microwave filter.
Figure 7:
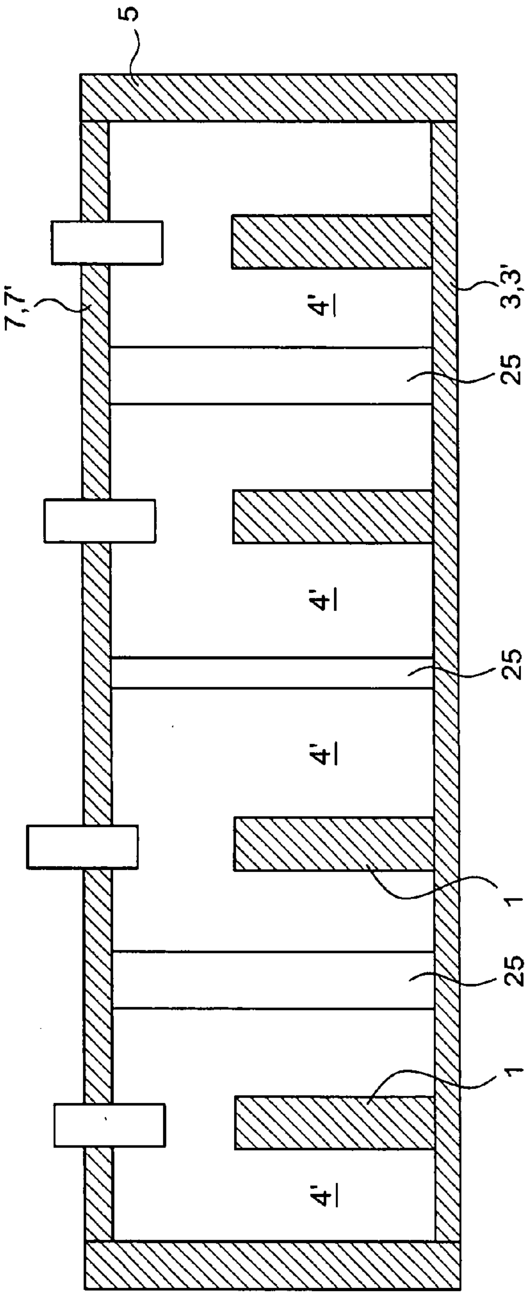
FIG. 7 shows an axial sectional view through the embodiment according to FIG. 6.

A four-circle microwave filter constructed from coaxial TEM resonators is also shown in a schematic plan view with the aid of FIG. 6 and in a schematic axial sectional view with the aid of FIG. 7.

It consists substantially of four individual resonators described with the aid of FIGS. 1 to 5, the individual inner spaces 4' of the individual resonators, being connected with one another in each case by means of a screen 25, introduced in the external conductor wall 5, in a given height and width. Finally, additional input and output devices are also provided in a known manner in the construction of the filter, by means of which an electromagnetic wave is input or output.

From this embodiment, the resonance frequency is determined by the length of the individual internal conductor 1, a fine balancing taking place by further screwing in or unscrewing of the tuning or balancing elements 13 in the form of the threaded members 13' mentioned.

As basically known, a filter shown with the aid of FIGS. 6 and 7 or a corresponding separating filter in the form of coaxial TEM resonators coupled by coupling screens would comprise at least two external connection bushes for a transmitter and a receiver, between which the filter path is formed.

Reference is made below to a modified embodiment according to FIGS. 7 and 8-9.

Basically, the construction corresponds to the construction described with the aid of the other embodiments, the example here being described with the aid of a two-circle microfilter using two coaxial TEM resonators. In this case, the resonator located on the right in FIG. 8 can also be tuned.

In this embodiment, a tuning element is used, which is constructed and functions as is basically described with the aid of the other embodiments, in particular with the aid of FIGS. 3 to 5.

Figure 8:
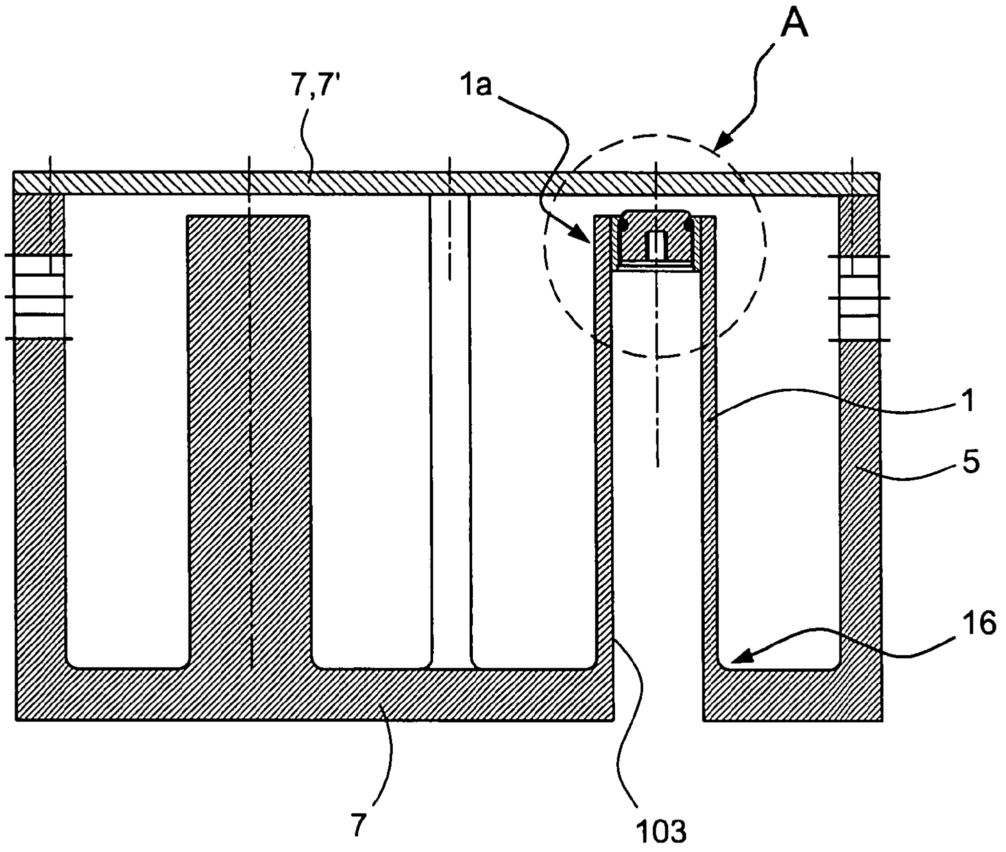
FIG. 8 shows a further schematic embodiment in an axial cross-sectional view comparable to the view of FIG. 7.
Figure 9:
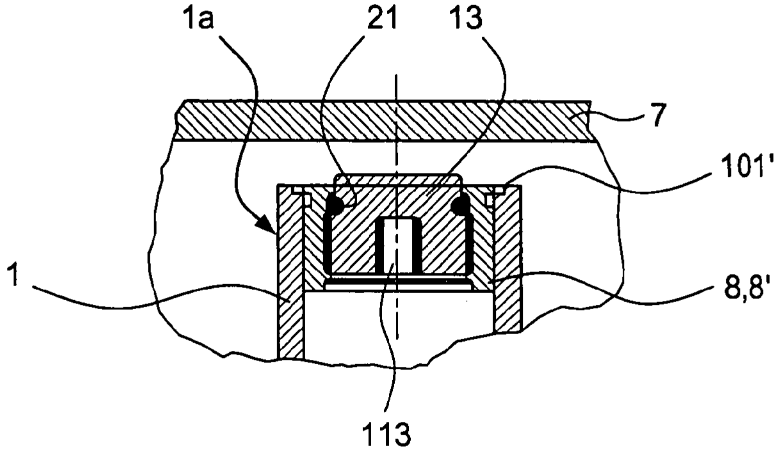
FIG. 9 shows a sectionwise enlarged axial sectional view according to the detail A in FIG. 8.

In contrast to these embodiments, however, in the variant according to FIGS. 7 and 8, the corresponding tuning element 13 is not seated so as to be variably rotatable in the housing 5 and in particular not in the end wall 7, i.e. in particular not in the cover 7', but on the upper free end 1*a* of the internal conductor 1.

In particular in this variant, the internal conductor 1 is provided with a continuous inner bore 103, so a tool, for example in the form of a screwdriver, can be introduced from the outside, namely from the lower side of the housing, into the inner bore 103, in order to then rotate the tuning element 13 seated at the upper free end 101. The tuning element 13 is then screwed, owing to the thread engagement, axially further, in this case, out of the internal conductor, so it projects over the upper free end 10 of the internal conductor further into the free inner space of the housing, in other words is located closer to the inner delimiting wall of the upper cover or the upper end wall 7, 7' or it can be rotated further in the opposite direction, so it enters more deeply into the internal conductor bore 103. For this purpose, the tuning element 13 in the embodiment according to FIGS. 7 and 8 has an outwardly pointing engagement portion 103 so, without opening the housing 5 by means of a corresponding tool by entering into the engagement portion 113, from the outside, a rotation of the tuning element 13 can be carried out, as is basically also possible from the outside in the embodiment according to FIGS. 3 to 7.

The thread-like tuning element 13 could also in this case, via its external thread 15, cooperate directly with an internal thread on the inside of the internal conductor bore 103, which to this extent would then form the thread receiver 8', comparably with the thread receiver 8' in the embodiment according to FIG. 3. A threaded bush 8, which is constructed comparably to the threaded bush 8 in the embodiment according to FIGS. 3 to 5 and is seated in the upper portion of the internal conductor bore 103, is preferably also used in this embodiment for the thread receiver 8'. This thread bush 8 is in turn provided with the described inner thread 11, in which the correspondingly configured external thread 15 of the tuning element 13 engages. The threaded design is shown in accordance with the embodiment described with the aid of FIGS. 3 and 5, so the same technical effect is produced here.

It can also be seen from this example that the threaded bush 8 is arranged in the internal conductor bore 103 conversely to the embodiment according to FIGS. 3 to 5, such that the peripheral annular shoulder 19 described with the aid of FIG. 3 and the inner delimiting face 19' come to rest adjacent to the annular face 101' located at the top, which at the upper free end 101 delimits the internal conductor 1 and/or the threaded bush 8 held here. The annular seal 21 described with the aid of FIGS. 3 to 5 is also provided again, specifically at the same position as in the embodiment according to FIGS. 3 to 5.

In other words, the tuning element described with the aid of FIGS. 3 to 5 and also the threaded bush described with the aid of these figures can be inserted and used with the same configuration and mode of functioning or similar design, preferably at the upper end of the internal conductor 1.

The invention claimed is:

1. A high frequency filter in a coaxial construction with at least one resonator, comprising:

at least one resonator comprising a housing with an inner space, the housing comprising first and second end walls located offset with respect to one another in the axial direction, an external conductor provided between the first and second end walls, an internal conductor held by a lower end thereof on said first end wall and electrically connected to the first end wall, said internal conductor having a free upper end, the free upper end of the internal conductor opposing the lower end thereof at a spacing in front of the opposing second end wall, a thread receiver with an internal thread provided in the second end wall opposing the free end of the internal conductor or in a region of the free end of the internal conductor, the thread receiver having a thread pitch and a thread pitch angle, a tuning element with an external thread configured to be screwed in or unscrewed to a variable extent into the thread receiver, to provide a distancing space between the free ends of the internal conductor and the second end wall of the housing located opposite thereto, the external thread having a thread pitch and a thread pitch angle, the thread pitch or the thread pitch angle of the external thread of the tuning element differing from the thread pitch or the thread pitch angle of the internal thread of the thread receiver at least in a partial portion of a length of the internal thread and/or of the external thread, a difference between the thread pitches or the thread pitch angle between the external thread of the tuning element and the internal thread of the thread receiver being more than 0.5%.

2. The high frequency filter as claimed in claim 1, wherein the difference between the thread pitch or the thread pitch angles of the external thread of the tuning element and of the internal thread of the thread receiver is more than 1.5% and less than 4.5%.

3. The high frequency filter as claimed in claim 1, wherein the difference between the thread pitch or the thread pitch angles of the external thread of the tuning element and of the internal thread of the thread receiver is 2% to 4%.

4. The high frequency filter as claimed in claim 1, wherein the external thread of the tuning element is interruption-free.

5. The high frequency filter as claimed in claim 1, wherein the internal thread of the thread receiver is interruption-free.

6. The high frequency filter as claimed in claim 1, wherein the external thread of the tuning element comprises two external thread portions located offset in the axial direction of the tuning element.

7. The high frequency filter as claimed in claim 1, wherein the internal thread of the thread receiver comprises two internal thread portions located offset in the axial direction of the thread receiver.

8. The high frequency filter as claimed claim 1, wherein the external thread of the tuning element and/or the internal thread of the thread receiver, adjacent to an inner space of the housing, comprises a thread-free portion.

9. The high frequency filter as claimed in claim 8, wherein a distancing annular space is formed between the previously-mentioned thread-free portion and a further thread-free portion of the tuning element or of the thread receiver.

10. The high frequency filter as claimed in claim 9, wherein the distancing annular space is delimited with respect to an inner space by an annular shoulder, which is configured on the thread receiver and protrudes in the direction of the tuning element with a radial component.

11. The high frequency filter as claimed in claim 8, wherein the thread-free portion has a thread-free distancing annular space and an axial length of the thread-free distancing annular space is more than 0.5 mm and less than 3 mm.

12. The high frequency filter as claimed in claim 1, wherein an annular seal is provided between the tuning element and the thread receiver and is inserted in an annular recess in the tuning element and cooperates with the inside of the thread receiver, at a transition from the thread portion to a thread-free portion.

13. The high frequency filter as claimed in claim 1, wherein the housing has a cover having an end wall, and the thread receiver is configured in a bore in the end wall, in the cover of the housing.

14. The high frequency filter as claimed in claim 1, wherein the thread receiver is configured in a region of the upper end of the internal conductor.

15. The high frequency filter as claimed in claim 14, wherein the internal conductor is provided with an internal conductor bore penetrating therethrough, which is accessible from the region outside the housing.

16. The high frequency filter as claimed in claim 14, wherein the tuning element comprises an engagement portion which is accessible from outside the housing via an internal conductor bore.

17. The high frequency filter as claimed in claim 1, wherein the thread receiver consists of a threaded sleeve, which is mechanically held in a bore in the housing or in or on the internal conductor and is electrically connected thereto.

18. The high frequency filter as claimed in claim 1, wherein an annular seal is provided between the tuning element and the thread receiver and is seated in a peripheral annular groove, which is configured peripherally in the tuning element.

19. The high frequency filter as claimed in claim 1, wherein an annular seal is provided between the tuning element and the thread receiver and is seated in a peripheral annular groove, which is configured peripherally in the thread receiver.

20. The high frequency filter as claimed in claim 1 wherein, located in an axial partial length, in the vicinity of the resonator inner space, a distancing annular space is configured between the tuning element and the thread receiver, which is thread-free in design.

21. The high frequency filter as claimed in claim 1, wherein the at least one resonator comprises a plurality of resonators in a common housing provided with a plurality of inner spaces each with associated internal conductors, wherein the inner spaces of the plurality of resonators are connected by means of through openings in the form of plates in the external conductor.

22. The high frequency filter as claimed in claim 1, wherein said difference between the thread pitches or the thread pitch angle between the external thread of the tuning element and the internal thread of the thread receiver is 1% to 5%.

23. A high frequency filter comprising:

a cylindrical resonator housing comprising first and second opposing walls and defining a cavity therein;

an internal conductor disposed within said cavity and electrically and mechanically connected to said first wall;

said second wall defining a threaded opening opposing at least a portion of said internal conductor, said threaded opening having threads with a first pitch and first pitch angle;

a threaded tuning element configured to be at least partially threadably engaged with said threaded opening, said threaded tuning element having threads with a second pitch and second pitch angle, the second pitch and/or second pitch angle being designed and structured to differ by at least 1.5% from the first pitch and/or first pitch angle to provide rotation of said threaded tuning element with increasing exertion of force until said threaded tuning element has reached a desired tuning position, providing a high contact functional engagement that provides reproducible electrical tuning element penetration into said cavity.

* * * * *